Figure 1:
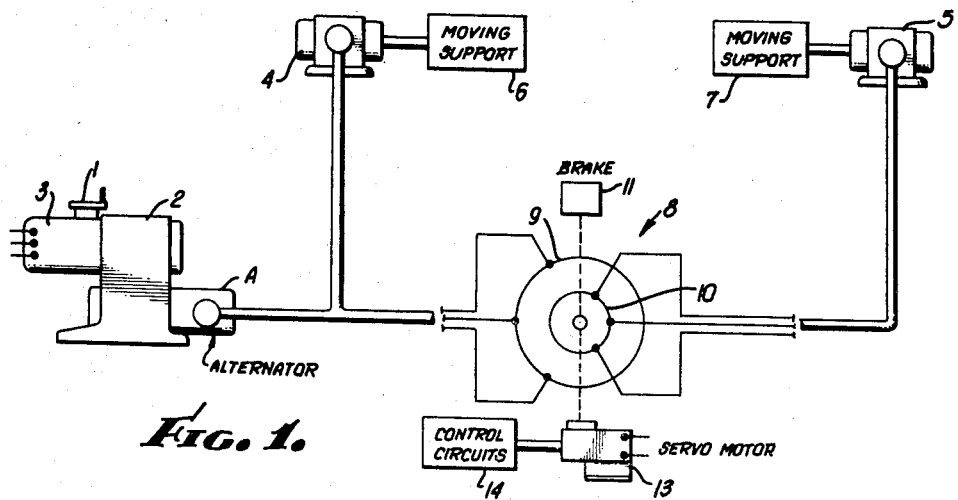

March 30, 1965    J. H. WALLACE    3,176,207
ELECTRICAL MOTOR DRIVE SYSTEM HAVING POSITION CONTROL
Filed June 19, 1961

JOHN H. WALLACE
INVENTOR.

BY Flam and Flam
ATTORNEYS.

United States Patent Office 3,176,207
Patented Mar. 30, 1965

3,176,207
ELECTRICAL MOTOR DRIVE SYSTEM HAVING POSITION CONTROL
John H. Wallace, West Haven, Conn., assignor, by mesne assignments, to Emerson Electric Co., a corporation of Missouri
Filed June 19, 1961, Ser. No. 118,108
1 Claim. (Cl. 318—67)

This invention relates to the operation of a plurality of electric motors for driving loads at an adjustable speed. As an example, the load for each motor may be some form of a moving support, such as a conveyor belt or a rotating table. This type of operation is described in a prior application, filed on August 12, 1960, in the names of John H. Wallace and Patrick J. Colleran, under Serial No. 49,345, and assigned to the same assignee as the present application.

In an important form of this system, the moving supports respectively carry parts or apparatus that must arrive simultaneously or nearly simultaneously at a station. The speed of the motors is adjustable by adjustment of the speed of the alternator; and such adjustment may require that one support be advanced or retarded with respect to the other support.

As an example, in glass making machinery, an angularly movable table may support a series of molds, each intended to receive a charge of molten glass in succession, and deposited from a moving conveyor. When the speeds of the conveyor and table are increased by increasing the speed of the motors, the time taken for the glass to drop onto the table being constant, the molds on the table will have moved somewhat ahead of the glass. To compensate for this, the conveyor must be shifted slightly ahead with respect to the table; or else the table must be shifted slightly behind the conveyor. Other instances where the relative "phases" of the moving supports need adjustment are readily apparent.

It is one of the objects of this invention to provide a simple and effective control for accomplishing the desired phase shift in either direction.

It is another object of this invention to provide an electrical differential device that is operated either automatically or manually, in order to shift relatively a moving support in either direction with respect to a stationary or movable support.

The electrical differential device is useful in other combinations, one of which will now be discussed.

While usually synchronous motors are used for effecting aligned motion between two moving supports, in some instances a sufficiently satisfactory synchrony is obtained by the use of induction motors.

In moving a web or other flexible element from a supply roll, use is often made of a pair of motors, each operating a pair of rollers between which the web extends. In order to apply the proper tension on the web, it is necessary slightly to overdrive the forward rollers. The degree of tension thus depends upon the ratio of the speeds of the two sets of rollers.

It is one of the objects of this invention to effect such a speed differential, and to provide accurate adjustment thereof in a simple manner.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Figure 2:
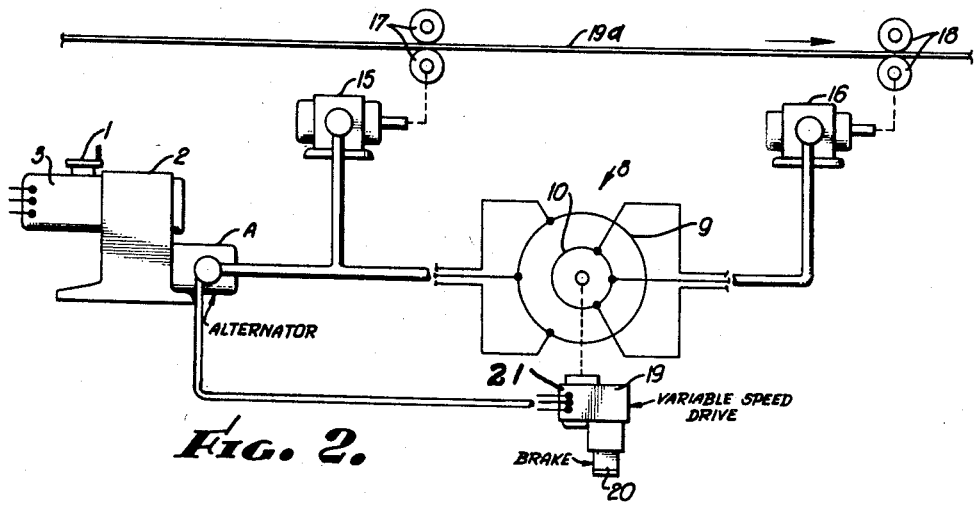

Referring to the drawings:

FIGURE 1 is a diagram of a system incorporating the invention in which the poles of one polyphase motor may be shifted in either direction with respect to another polyphase motor, said motors operating supports for movement in union; and FIG. 2 is a diagramamtic view of a system, somewhat similar to that of FIG. 1, but adapted to provide a constant draw or tension on a web advanced by pinch rolls, driven by multiphase motors.

In FIG. 1 a multiphase alternator A is shown as driven by the aid of a variable ratio transmission mechanism 2. The ratio of this mechanism may be adjusted, for example, by handwheel 1.

One form of such a variable ratio mechanism is illustrated in Patent No. 2,398,235, issued on April 9, 1946, in the name of Frederick O. Luenberger.

The input side of the transmission mechanism 2 is driven by an induction motor 3 connected by appropriate conductors to a source of electrical energy.

Connected to the alternator A are the two multiphase motors 4 and 5 acting as "slave motors." These motors are adapted to drive moving supports 6 and 7. When exact synchronism is essential, these motors 4 and 5 are synchronous motors. Upon adjustment of the speed of alternator A, there is a corresponding adjustment of the motor speeds.

The moving supports 6 and 7 may operate conveyors or work tables. The two moving supports are arranged to be synchronized in their motion so that, for example, a moving mold for casting glass articles is in proper position to receive a charge of molten glass, deposited from the other of the moving work supports. As explained hereinabove, it may be necessary, when the speed of the conveyors or tables is changed, to shift one moving support either forward or backward with respect to the other moving support. Thus the period for the glass to drop from one support into a mold carried by the other support is constant. When the speed of the conveyors is, for example, increased, the distance between the glass carrier on one conveyor and the mold on the other conveyor must be likewise increased in order not to be beyond the glass when the glass falls onto the said other conveyor.

In order to effect this shifting of the work supports, use is made of an electrical differential device (rotary transformer) 8. This differential device 8 comprises two inductively coupled members 9 and 10, which are rotatable about a common axis. The member 9, for example, may be wound as the stator of an alternating current motor. The member 10 may be wound as for an induction motor. The number of poles formed by the circuits of these windings may be conveniently determined. For example, if the stator 9 is wound for a two-pole machine, the rotor 10 would also be wound for a two-pole machine.

It is well known that applying electrical energy to the stator 9 produces a rotating field. This field in turn generates a multiphase electromotive force in the rotor 10. When the rotor 10 is held against rotation, the frequency generated is that of the stator. When the rotor 10 is angularly adjusted and maintained at the adjusted position, the effect is to shift the rotating magnetic poles induced in the stator of motor 5 with respect to the rotating poles induced in the stator of motor 4. The final result is a relative shift in the conveyors or work supports 6 and 7.

An electric brake 11 may be utilized to release the rotor 10 as soon as it is desired to rotate or angularly adjust the member 10.

A servomotor 13 is provided for adjusting the angular position of the rotor 10. Control circuits 14, such as remotely operated switches, may be utilized to effect the adjustment. Whenever the servomotor 13 is energized, the brake 11 is also energized to release the rotor 10 for rotation. During inactivity of the motor 13, the brake 11 stops the rotor 10 from angular movement in response to the dynamo-electric action between the inductively coupled windings of the stator 9 and rotor 10.

In the system shown in FIG. 2, the motors 15 and 16, which are also preferably synchronous, are supplied with electrical energy by the alternator A. Motor 21 is connected to the rotor 10 of the electrical differential mechanism 8.

The motors 15 and 16, in this instance, drive pincher rollers, respectively, which grip a web 19a. This web 19a may be paper, cloth or material adapted to be kept under tension or "drawn" between the spaced sets of rollers 17 and 18.

By continuously rotating the rotor 10 in one or the other direction, the frequency of the alternating current generated by rotation of the rotor 10 is algebraically added to the frequency of the alternator A. Accordingly, there is produced a fixed differential in the speed of the rollers 17 and 18.

Usually, the speed of rollers 18 is increased over the speed of rollers 17 by a relatively small ratio; for example, by 5%. Thus, if the rotation of rollers 17 is at the rate of 1000 revolutions per minute, the rollers 18 may be caused to rotate at the rate of 1050 revolutions per minute. The angular movement of rotor 10 is such as to provide the differential of 50 revolutions per minute.

In order to drive the rotor 10, use is made of a variable speed drive 19 having an electro-magnetically operated brake 20. This variable speed drive may be similar to the variable ratio transmission mechanism 2 of FIG. 1. It may be controlled manually to adjust the speed of rotation of the rotor 10.

When the motor 21 driving the mechanism 19 is operated on a frequency independent of the speed of alternator A, and at a fixed frequency, the motor 16 will attain a speed having a fixed differential in revolutions with respect to the speed of motor 15. Otherwise, when the motor 21 is driven from alternator A, the ratio of the speeds of motors 15 and 16 remains constant.

The inventor claims:

An A.C. system wherein two polyphase A.C. motors are adjustably coordinated with one another, comprising a polyphase alternator; variable speed means connected to drive said alternator selectively at a chosen speed to produce a desired frequency; a first A.C. slave motor electrically connected to said alternator to run at a speed which is a direct function of the frequency produced by the alternator; a rotary transformer having a stator and a rotor, inductively coupled, and the stator of which is electrically connected to the alternator; a second A.C. slave motor electrically connected to the rotor of said rotary transformer, hence, in series with said rotary transformer, to said alternator; a second variable speed means mechanically connected to the rotor of the rotary transformer, said second variable speed means including a separate A.C. motor and a brake adapted to be selectively applied and released, said separate A.C. motor being electrically connected to the alternator to run at a speed which is a direct function of the frequency produced by the alternator whereby (1) when said brake is applied to prevent rotation of the rotary transformer, the two A.C. slave motors run in substantial synchronism, (2) when said brake is released only sufficiently to permit the rotor of the rotary transformer to move through a small angle and reapplied, the magnetic poles of the second slave motor are shifted through a small angle, and (3) when said brake is released and the separate A.C. motor is energized by the alternator, the second slave motor will run at a different speed but at a constant ratio with respect to the speed of the first slave motor, regardless of any change of frequency of the alternator.

References Cited in the file of this patent

UNITED STATES PATENTS

| | | |
|---|---|---|
| 522,820 | Bentley | July 10, 1894 |
| 615,673 | Bradley | Dec. 13, 1898 |
| 1,075,683 | Batchelder | Oct. 14, 1913 |
| 1,757,734 | Perry | May 6, 1930 |
| 2,041,510 | Parvin | May 19, 1936 |
| 2,560,485 | Sharp | July 10, 1951 |
| 2,782,349 | Sharp | Feb. 19, 1957 |

FOREIGN PATENTS

| | | |
|---|---|---|
| 671,336 | Germany | Feb. 4, 1939 |
| 847,941 | Great Britain | Sept. 14, 1960 |